United States Patent [19]

Fenske

[11] 4,239,736

[45] Dec. 16, 1980

[54] METHOD FOR INCREASING THE BRIGHTNESS OF LIMESTONE

[75] Inventor: Douglas H. Fenske, Houston, Tex.

[73] Assignee: Dresser Industries, Inc., Dallas, Tex.

[21] Appl. No.: 15,089

[22] Filed: Feb. 26, 1979

[51] Int. Cl.³ ............................................. G01F 11/18
[52] U.S. Cl. .................................. 423/173; 423/264; 423/430
[58] Field of Search ....................... 423/173, 264, 430

[56] References Cited

FOREIGN PATENT DOCUMENTS

| 2741427 | 7/1978 | Fed. Rep. of Germany | 423/430 |
| 50-122498 | 9/1975 | Japan | 423/430 |
| 51-47597 | 4/1976 | Japan | 423/430 |
| 51-47598 | 4/1976 | Japan | 423/430 |
| 567998 | 3/1945 | United Kingdom | 423/173 |

*Primary Examiner*—Earl C. Thomas
*Assistant Examiner*—Wayne A. Langel
*Attorney, Agent, or Firm*—Raymond T. Majesko; John N. Hazelwood

[57] ABSTRACT

Method for improving the brightness of limestone utilizing a flocculating agent and a bleaching agent where the pH of the slurry is between about 7 and 9.

9 Claims, No Drawings

METHOD FOR INCREASING THE BRIGHTNESS OF LIMESTONE

Most limestone deposits contain small amounts of iron oxides or other forms of iron. The iron imparts a yellow to pink or red tint to the ground product rendering it unacceptable for the most lucrative filler and pigment applications which require a bright white color with little or no hue or tint. Increased brightness has been obtained by physically removing iron bearing segments of the limestone by washing or comminution followed by classification, magnetic separation, flotation and chemically bleaching or leaching with solvents for iron oxides followed by filtering. Dithionite type bleaching agents perform most efficiently under acidic conditions of 2 to 5 pH, which cannot be obtained due to buffering by calcium carbonate in the limestone as it reacts with the acid.

Calcium oxide has been tested since it is well known that any calcium oxide generated in drying limestone causes flocculation of the limestone particles. However, calcium oxide added stepwise up to about 3 lbs per ton of limestone failed to produce a satisfactory separation by centrifuging or filtration. The best results achieved at a pH of 11.0 yielded a cake of about 68% solids with a supernate containing about 16% solids, which is equivalent to a 23% product loss to the supernate.

Attempts were made to treat the limestone with hydrochloric acid. However, the results were negative because the hydrochloric acid was immediately neutralized by the calcium carbonate.

Accordingly, it is an object of the present invention to increase the brightness of limestone.

It is another object of the invention to remove iron from the limestone.

It is still another object of the invention to floccuate dispersed limestone particles sufficiently so that water can be removed by centrifuging or filtering.

In accordance with the present invention, there is provided a method for improving the brightness of limestone. The limestone is first ground to the desired size and then is formed into a slurry, preferably with water. An acidic flocculating agent, in amounts sufficient to provide a pH between about 7 and 9 is added. A bleaching agent, in at least an amount sufficient to react with any iron present in the limestone, is added. After an adequate reaction time, the flocculate is filtered.

If the pH of the limestone is low, i.e. 9.3 to 9.6 after grinding to size, then sufficient acid to flocculate for good filtration will lower the pH to about 7. On the other hand, if the pH is high after grinding, i.e. 9.9 to 10.2, a higher addition of acid is required and good flocculation can occur at a pH as high as 8.7 to 9. However, most effective bleaching appears to occur at a pH of 8 or less. Accordingly, it is preferred that pH be maintained between about 7 and 8.

The solids content of the slurry may be between 15 and 50%. The preferred solids for bleaching and filtering is between about 35 and 40% solids. This is a compromise of low solids 15 to 20%, which would maximize the removal of soluble contaminates with the high solids range of 45 to 50% which would increase the filter rate but not remove enough of the contaminates.

The preferred flocculating material is acetic acid of 10% solution strength and in amounts between about 1 and 10 lbs/ton of limestone. However, other flocculating agents such as aluminum chloride, aluminum sulphate, citric acid, oxalic acid, etc., may be employed. Typically, the amount need only be between about 1 and 5 lbs per ton.

As for the bleaching agents, the hydrosulphites, particularly sodium and zinc are preferred. Other hydrosulfites, K-Brite-3E and K-Brite-3K which are proprietary products of the Virginia Chemical Company, perform satisfactorily. In addition, other bleaching agents such as sulphur dioxide and zinc dust can also be used with varying results. The amount of bleaching agent may range between about 3 and 15 lbs per ton of limestone. The preferred amount is from about 6 to 10 lbs per ton of limestone, since little or no improvement will be obtained above this level. Also, higher amounts will add to the cost of the product.

It is further preferred that the slurry be maintained at a temperature of between about 70° to 120° F. The 120° F. temperature is the maximum because that level would be operable from the heat generated during attrition milling. Higher temperatures would add costs and complexities to the system. Elevated temperatures only increase the reaction rate which usually is optimum at 100° to 120° F.

Variations in the process which may be optimized, would include residence time between the flocculant addition and the bleach addition and time for the bleach to complete reaction correlated with the temperature of the slurry.

The following examples are illustrative of the teachings of the invention.

EXAMPLE I

A sample of Central Texas limestone was subjected to crushing and impact milling such that approximately 86% was −100 mesh and 59% was −325 mesh. A 200-pound sample of this ground limestone was slurried to a solid content of about 25%.

The slurry was allowed to settle sufficiently to allow particles coarser than 3 microns to settle out and the fine silt was removed. The desliming process was repeated, removing a total of 14.5% by weight, of the limestone as a brown slime. The deslimed/settled fraction was again slurried and dispersed with 0.3% polyacrylate and fed to a sand mill which contained glass beads of −18 mesh plus 30 mesh size. The mill when filled with limestone slurry contained the following composition: beads 3.5 parts, limestone 1 part and water 2.5 parts, by weight. The same mill used for this experiment was a conventional ore attrition scrubber as used for cleaning mineral surfaces before flotation.

The machine was fitted with a 60-mesh screen across the discharge aperture to prevent discharge of the glass beads. After a sufficient residence time to produce the desired particle size distribution of the limestone, the feed slurry was metered to the scrubber at a rate which produced the desired size distribution on a continous basis. All of the material was sized less than 20 microns.

A sample of the slurry was flocculated for filtration by the addition of 3 lbs of acetic acid per ton of limestone which reduced the pH of the slurry from 10.1 to 8.0. The filter cake was dried, pulverized, and measured for brightness on a Photovolt reflectance meter equipped with blue, green and amber filters.

A second sample was treated in a like manner except that 6 lbs of sodium hydrosulfite per ton of limestone was mixed into the slurry after addition of the acetic acid and allowed to stand for 60 minutes before filtering.

A third sample was treated in the same manner as the second sample, except that 4 lbs of aluminum chloride per ton of limestone was used to reduce the pH of the slurry from 10.1 to 8.0 before addition of 6 lbs per ton of sodium hydrosulfite. The results of these bleaching tests are shown in Table I below.

TABLE I

| Flocculant | Lbs/Ton | Slurry pH | Bleach Lbs/Ton | Photovolt Brightness | | |
|---|---|---|---|---|---|---|
| | | | | Blue Filter | Green Filter | Amber Filter |
| Acetic Acid | 3.0 | 8.0 | 0 | 90.0 | 93.3 | 94.3 |
| Acetic Acid | 3.0 | 8.0 | 6 | 93.5 | 94.0 | 95.2 |
| Aluminum Chloride | 4.0 | 8.0 | 6 | 93.8 | 94.8 | 95.8 |

EXAMPLE II

A Texas limestone, which was beneficiated by dry crushing, dry grinding and dry classification, yielded a coarse pigment of marginal quality having a particle sizing of 20% coarser than 20 microns and the balance less than 20 microns with a brightness of 87 with the blue filter.

After grinding this limestone in a like manner and to the same fineness as that in Example I, the slurry contained 40.6% solids, had a pH of 10.1 and a temperature of 120° F.

The slurry was divided into three representative samples for various treatments. The first treatment was simply dewater and dry. The second treatment was to flocculate with 3.3 pounds per ton acetic acid, bleach with 6 lbs per ton sodium hydrosulfite for 1 hour, dewater and dry. The third treatment was to flocculate with 4.6 pounds per ton aluminum chloride, bleach with 6 pounds per ton sodium hydrosulfite for 1 hour, dewater and dry. The first three treatments were carried out at a temperature of 120° F. The fourth treatment was to flocculate with 3.3 lbs per ton acetic acid, bleach, dewater and dry as in the third treatment, except that a temperature of 72° F. was maintained. The results of these tests are shown in Table II below.

TABLE II

| Flocculant | Lbs/Ton | Slurry pH | Bleach Lbs/Ton | Photovolt Brightness | | |
|---|---|---|---|---|---|---|
| | | | | Blue Filter | Green Filter | Amber Filter |
| None (120° F.) | — | 10.1 | 0 | 92.5 | 95.0 | 96.5 |
| Acetic Acid (120° F.) | 3.3 | 8.1 | 6 | 97.2 | 97.8 | 98.2 |
| Aluminum Chloride (120° F.) | 4.6 | 8.0 | 6 | 97.8 | 97.5 | 98.2 |
| Acetic Acid (72° F.) | 3.3 | 8.0 | 6 | 95.5 | 95.0 | 95.8 |

EXAMPLE III

The limestone feed for Example III was ground as in Example II, except that the feed rate was increased to yield a coarser product. After grinding, this material had a pH of 9.7. Two pounds per ton of acetic acid was required to produce a sufficient degree of flocculation to filter satisfactorily which brought the pH down to 7.4. Samples of this lot were heated at temperatures from 70° F. to 105° F. To three of the four samples, after the acetic was added, the sodium hydrosulfite was added and the samples were aged 15 minutes and filtered. The tests results are shown in Table III below.

TABLE III

| Flocculant | Lbs/Ton | Slurry pH | Bleach Lbs/Ton | Bleach Photovolt Brightness | | | |
|---|---|---|---|---|---|---|---|
| | | | | Temp. °F. | Blue Filter | Green Filter | Amber Filter |
| Acetic Acid | 2.0 | 7.4 | 0 | 70 | 93.2 | 94.0 | 95.0 |
| Acetic Acid | 2.0 | 7.4 | 10 | 70 | 94.5 | 95.0 | 95.0 |
| Acetic Acid | 2.0 | 7.4 | 10 | 92 | 96.7 | 96.5 | 97.1 |
| Acetic Acid | 2.0 | 7.4 | 10 | 105 | 97.0 | 96.5 | 97.0 |

EXAMPLE IV

The effects of bleaching are shown on a coarser pigment grade, a size preferred by the paint industry, produced by dry grinding (Table IV) and wet grinding (Table V). The size distribution of the ground limestone is set forth below.

| Size Microns | % Wt. Finer | |
|---|---|---|
| | Dry Ground | Wet Ground |
| 20 | 99.0 | 99.0 |
| 5 | 75.0 | 82.0 |
| 2 | 34.0 | 45.0 |
| 1 | 13.0 | 20.0 |
| 0.5 | 3.0 | 6.0 |

The dry ground slurry contained 40% solids with 0.2% polyacrylate dispersant. It was flocculated with 2 lbs per ton acetic acid and bleached with 10 lbs per ton sodium hydrosulfite at 75° F. It was then dewatered and dried for brightness measurement and the results are shown in Table IV below.

TABLE IV

| Product | Bleach Time | Photovolt Brightness | | |
|---|---|---|---|---|
| | | Blue Filter | Green Filter | Amber Filter |
| 1 No bleach | 0 | 89.0 | 92.0 | 93.0 |
| 2 Bleach added | 15 min. | 91.0 | 93.2 | 94.0 |
| 3 Bleach added | 60 min. | 91.2 | 93.2 | 94.0 |

The wet ground slurry contained 40% solids. Two of the samples were heated to 105° F. and 97° F., respectively, flocculated with 2 lbs per ton of acetic acid and bleached with 10 lbs per ton of sodium hydrosulfite. The two samples were aged 15 minutes and all samples were dewatered and dried. The results are shown in Table V below.

TABLE V

| Product | Temperature | Photovolt Brightness | | |
|---|---|---|---|---|
| | | Blue Filter | Green Filter | Amber Filter |
| 1 No bleach | 105° F. | 91.0 | 92.5 | 93.3 |
| 2 Bleach added | 105° F. | 94.1 | 95.0 | 95.8 |
| 3 Bleach added | 97° F. | 94.0 | 95.2 | 95.8 |

EXAMPLE V

Additional acidic flocculants were tested for compatibility with the sodium hydrosulfite bleach. The limestone slurry for these series of tests was prepared in like manner to that shown in Example I. The ground limestone slurry was heated to 105° F., sufficient flocculant was added for satisfactory filtration and sufficient bleach was added. The samples were aged for 60 minutes, filtered and dried. The results are shown in Table VI below.

TABLE VI

| Flocculant | Lbs/Ton | Slurry pH | Bleach Lbs/Ton | Photovolt Brightness | | |
|---|---|---|---|---|---|---|
| | | | | Blue Filter | Green Filter | Amber Filter |
| None | 0 | 10.1 | 0 | 92.5 | 95.0 | 96.5 |
| Acetic Acid | 2 | 9.4 | 6 | 94.3 | 96.0 | 97.0 |
| Acetic Acid | 3 | 8.5 | 6 | 96.7 | 95.3 | 97.0 |
| Aluminum Chloride | 4 | 8.4 | 6 | 97.2 | 97.2 | 97.8 |
| Aluminum Sulfate | 3 | 9.6 | 6 | 95.0 | 95.5 | 97.0 |
| Oxalic Acid | 2 | 8.8 | 6 | 95.2 | 97.0 | 97.2 |

EXAMPLE VI

Here the effect of varying amounts of acetic acid on the brightness of bleached limestone was tested. Limestone in this example was prepared in the same manner as in Example I. It was heated to 105° F. in slurry form, treated with acetic acid, and agitated with 6 lbs per ton of sodium hydrosulfite in each case, except for the blank, and aged for 15 minutes before filtration. The results are shown in Table VII below.

TABLE VII

| Flocculant | Lbs/Ton | Slurry pH | Bleach Lbs/Ton | Photovolt Brightness | | |
|---|---|---|---|---|---|---|
| | | | | Blue Filter | Green Filter | Amber Filter |
| Blank | 0 | 10.1 | 0 | 92.5 | 95.0 | 96.5 |
| Acetic Acid | 2 | 9.4 | 6 | 94.3 | 96.0 | 97.0 |
| Acetic Acid | 3 | 8.5 | 6 | 96.7 | 95.3 | 97.0 |
| Acetic Acid | 3.3 | 8.1 | 6 | 97.2 | 97.8 | 98.2 |

EXAMPLE VII

A limestone from a deposit in Jamaica was prepared in the same manner as Example II, and tested for brightness improvement by wet grinding and to coarse and fine grinds followed by bleaching. The size distribution of the grinder feed and ground products is set forth below.

| Particle Size Distribution Microns | Percent Finer | | |
|---|---|---|---|
| | Grinder Feed | Coarse Grind | Fine Grind |
| 15 | 80.5 | 100 | 99.5 |
| 10 | 70.0 | 98 | 99.0 |
| 5 | 48.0 | 82 | 97.5 |
| 2 | 17.0 | 42 | 95.5 |
| 1 | 5.0 | 18 | 56.5 |
| 0.5 | 2.0 | 6 | 19.0 |

Bleaching tests were run on the ground samples by heating to 120° F., and adding acetic acid for proper flocculation for filtering. Ten pounds per ton of sodium hydrosulfite was added and the slurry was cured for 45 minutes before filtering. Brightness test results are shown in Table VIII below.

TABLE VIII

| Flocculant | Lbs/Ton | Slurry pH | Bleach Lbs/Ton | Photovolt Brightness | | |
|---|---|---|---|---|---|---|
| | | | | Blue Filter | Green Filter | Amber Filter |
| Grinder feed | 0 | — | 0 | 85.8 | 90.5 | 91.3 |
| Coarse grind | 0 | 9.5 | 0 | 89.2 | 92.0 | 93.2 |
| Acetic acid | 2 | 7.6 | 10 | 90.8 | 93.0 | 94.2 |
| Fine Grind | 0 | 10.3 | 0 | 92.5 | 95.0 | 95.0 |
| Acetic acid | 4.4 | 8.0 | 10 | 94.0 | 95.2 | 96.0 |

EXAMPLE VIII

A sample of Central Texas limestone was ground in a like manner and to the same size distribution as that described in Example II. The slurry contained 40.0% solids and had a pH of 9.8.

The slurry was divided into 6 representative samples for treatment. The first treatment was simply remove water by evaporation, to serve as a control sample. The second treatment was to flocculate with 2.2 pounds per ton of acetic acid, filter and dry. The final four treatments were similar to the second except 4, 6, 10 and 15 pounds per ton of sodium hydrosulfite was added 45 minutes before filtration. All samples were held at 105° F. during the period of treatment. After drying, the brightness of each sample was measured with a Photovolt Reflectance Meter equipped with a blue filter. The results of these tests are shown in Table IX below.

TABLE 1X

| Flocculant | Lbs/Ton | Slurry pH | Bleach Lbs/Ton | Photovolt Brightness Blue Filter |
|---|---|---|---|---|
| Control | 0 | 0 | 0 | 93.5 |
| Acetic Acid | 2.2 | 7.9 | 0 | 93.8 |
| Acetic Acid | 2.2 | 7.9 | 4 | 95.5 |
| Acetic Acid | 2.2 | 7.9 | 6 | 96.3 |
| Acetic Acid | 2.2 | 7.9 | 10 | 96.3 |
| Acetic Acid | 2.2 | 7.9 | 15 | 96.3 |

EXAMPLE IX

A sample of Central Texas limestone was wet ground in a like manner to that shown in Example IV with the same size distribution as the wet ground example. The ground slurry sample contained 40% solids and required 2.2 lbs acetic acid per ton of limestone to flocculate for filtration. The pH of slurry before bleach addition was 7.8.

Five aliquots were removed and treated with 10 lbs per ton additions of sodium hydrosulfite, zinc hydrosulfite, K-Brite-3E and K-Brite-3K. The slurry temperature was maintained at 105° F. for 60 minutes following additions of the bleaching agent, after which the liquid phase was removed and the solids dried for brightness measurements. Brightness test results are shown in Table X below.

TABLE X

| Bleach | Photovolt Brightness Blue Filter |
|---|---|
| Control | 93.5 |
| Sodium hydrosulfite | 95.8 |
| Zinc hydrosulfite | 95.5 |
| K-Brite-3E | 95.8 |
| K-Brite-3K | 95.8 |

It is intended that the foregoing description be construed as illustrative and not in limitation of the invention.

The embodiments of the invention in which an exclusive property or privilege is claimed are defined as follows:

1. A method for improving the brightness of limestone, containing at least a small amount of iron comprising grinding said limestone and forming a limestone slurry, adding an acidic flocculating agent to the slurry in amounts sufficient to provide a pH between about 7 and 9, adding a bleaching agent to the slurry in at least an amount sufficient to react with any iron present and separating the flocculate from the slurry.

2. A method according to claim 1 in which the slurry has a solids content between about 15 and 50%.

3. A method according to claim 1 in which the flocculant is present in amounts between about 1 and 10 pounds per ton of limestone.

4. A method according to claim 1, in which the flocculating agent is acetic acid.

5. A method according to claim 1, in which the bleaching agent is present in amounts between about 3 and 15 pounds per ton of limestone.

6. A method according to claim 1, in which the bleaching agent is a hydrosulfite.

7. A method according to claim 1, in which the bleaching agent is added to the slurry in a non-oxidizing atmosphere.

8. A method according to claim 1, in which the slurry is maintained at a temperature between about 70° and 120° F.

9. A method according to claim 1, in which the limestone is ground to a sizing of less than about 20 microns.

* * * * *